United States Patent [19]

Kajiwara et al.

[11] Patent Number: 5,534,238

[45] Date of Patent: Jul. 9, 1996

[54] METHOD FOR THE PREPARATION OF PURIFIED AQUEOUS HYDROGEN PEROXIDE SOLUTION

[75] Inventors: Shoichiro Kajiwara; Hirokazu Serizawa, both of Ashigarakami-gun, Japan

[73] Assignee: Mitsubishi Gas Chemical Company, Inc., Tokyo, Japan

[21] Appl. No.: 493,986

[22] Filed: Jun. 23, 1995

[30] Foreign Application Priority Data

Jun. 28, 1994 [JP] Japan ................................. 6-146526
Jun. 28, 1994 [JP] Japan ................................. 6-146527

[51] Int. Cl.$^6$ ............................................. C01B 15/01
[52] U.S. Cl. .................................................. 423/584
[58] Field of Search ............................................. 423/584

[56] References Cited

U.S. PATENT DOCUMENTS 3,294,488  12/1966  Dunlop et al. ........................ 423/584
4,999,179  3/1991  Sugihara et al. ..................... 423/584
5,200,166  4/1993  Shiga et al. ........................... 423/584
5,397,475  3/1995  Millar et al. ........................... 423/584

*Primary Examiner*—Wayne Langel
*Attorney, Agent, or Firm*—Wenderoth, Lind & Ponack

[57] ABSTRACT

An efficient method is proposed for the preparation of a highly purified aqueous hydrogen peroxide solution, which can be used even in a semiconductor process, from a crude aqueous solution containing metallic and inorganic impurities. The method comprises the steps of: (a) acidifying the crude solution by the addition of a specific amount of an acid such as sulfuric and nitric acids; and (b) passing the acidified crude solution through a column filled with a strongly acidic cation-exchange resin in the hydrogen-form or a mixture of the same with a strongly basic anion-exchange resin in the hydroxy-, carbonate- or hydrogencarbonate-form in a specified volume proportion so that the impurities are removed by ion-exchange. The efficiency of this purification treatment can be further enhanced by keeping the acidified crude solution for a certain length of time of, for example, at least 6 hours prior to the ion-exchange treatment in step (b).

6 Claims, No Drawings

METHOD FOR THE PREPARATION OF PURIFIED AQUEOUS HYDROGEN PEROXIDE SOLUTION

BACKGROUND OF THE INVENTION

The present invention relates to a method for the preparation of a purified aqueous hydrogen peroxide solution or, more particularly, to a method for the preparation of an aqueous hydrogen peroxide solution highly purified relative to metallic and inorganic impurities and suitable for use in the manufacturing process of semiconductor devices.

As is known, aqueous hydrogen peroxide solutions are currently produced by the method of autoxidation while one of the serious problems in the products produced by this method is that the aqueous hydrogen peroxide solution is contaminated with various metallic or inorganic impurities such as aluminum and the like originating in the materials constituting the structure of the production plant. For example, commercial products of hydrogen peroxide solutions, of which the concentration of hydrogen peroxide is 10 to 70% by weight, usually contain such metallic and inorganic impurities in an amount of as large as several hundreds of µg per liter. While aqueous hydrogen peroxide solutions are demanded in large quantities in the semiconductor industries, on the other hand, the hydrogen peroxide solutions used in these fields are required to have an extremely high purity containing metallic and inorganic impurities in an amount of as small as a few µg per liter or even smaller as a standard product. Accordingly, it is indispensable that the hydrogen peroxide solution obtained by the autoxidation method is subjected to a purification to remove the metallic and inorganic impurities as completely as possible when the intended use of the product is in the semiconductor industries.

Various methods have been proposed heretofore for the purification of an aqueous hydrogen peroxide solution relative to the metallic and inorganic impurities including a method in which an aqueous hydrogen peroxide solution containing metallic and inorganic impurities is passed through a bed of a cation-exchange resin so as to remove the cationic impurities by the ion-exchange reaction on the resin. This method, however, has problems that, although strongly cationic impurities of metals can be removed by merely bringing the solution into contact with the cation-exchange resin, the method is not effective for the metallic impurities not completely soluble or only weakly ionic impurities in an aqueous hydrogen peroxide solution such as, in particular, aluminum and anionic impurities originating from the metal-containing compounds which can assume both cationic and anionic forms in themselves such as aluminum, iron, chromium and the like. While sulfate anions are released in large quantities from the cation-exchange resin by the degradation of the sulfonate groups on the resin, the method is ineffective for the removal of the sulfate anions.

It is of course known that anion-exchange resins are effective for the removal of inorganic impurities from an aqueous hydrogen peroxide solution by passing the solution through a bed of the anion-exchange resin. It is known that contacting of an aqueous hydrogen peroxide solution, after a treatment in advance with a cation-exchange resin, and a strongly basic anion-exchange resin in the hydroxy-form is effective for the removal of inorganic impurities which can be removed by a mere contact with a strongly acidic cation-exchange resin.

However, purification of an aqueous hydrogen peroxide solution by use of a strongly basic anion-exchange resin in the hydroxy-form has some problems that, for example, decomposition of hydrogen peroxide is accelerated when the solution is brought into contact with the strongly basic anion-exchange resin. Decomposition of hydrogen peroxide is further accelerated when the aqueous hydrogen peroxide solution contains metallic impurities of iron, chromium and the like.

Furthermore, the method of contacting of an aqueous hydrogen peroxide solution with a strongly basic anion-exchange resin in the hydroxy-form is not effective for the removal of the metallic impurities not completely soluble in the solution and weakly cationic and anionic metallic impurities so that highly purified hydrogen peroxide solutions suitable for use in the manufacturing processes of semiconductor devices can hardly be obtained by these conventional methods.

Japanese Patent Publication 35-16677 teaches that anion-exchange resins can be used for the purification of aqueous hydrogen peroxide solutions when the anion-exchange resin is converted from the hydroxy-form into the hydrogencarbonate-form or carbonate-form so as to decrease the basicity of the resin. Further, Japanese Patent Kokai 5-17105 teaches that the decomposition of hydrogen peroxide can be prevented by the addition of an acid to the hydrogen peroxide solution in the contacting treatment of the solution with an anion-exchange resin.

These methods, however, are not quite satisfactory to comply with the requirement for the complete removal of metallic impurities not completely soluble in the aqueous hydrogen peroxide solution or weakly cationic and anionic metallic impurities so that a highly purified hydrogen peroxide solution as desired cannot be obtained by these methods. Furthermore, these methods are not practically applicable to the purification of an aqueous hydrogen peroxide solution due to the difficulty in completely preventing decomposition of hydrogen peroxide caused by the remaining metallic impurities.

SUMMARY OF THE INVENTION

The present invention accordingly has an object to provide a novel and reliable method for the preparation of a highly purified aqueous hydrogen peroxide solution, of which the content of impurities or, in particular, each of the metallic impurities of aluminum, iron and chromium does not exceed 2 ppb by weight of the metallic element or, desirably, does not exceed 1 ppb by weight of the metallic element by a specific purification method starting from a conventional crude aqueous hydrogen peroxide solution prepared, for example, by the autoxidation method.

Thus, the method of the present invention for the preparation of a highly purified aqueous hydrogen peroxide solution from a crude aqueous hydrogen peroxide solution containing metallic and inorganic impurities as the starting material comprises the steps of:

(a) acidifying the crude aqueous hydrogen peroxide solution as the starting material by the addition of an acid having an acid dissociation index pKa in pure water not higher than 5 at 25° C. in an amount of 0.005 to 5 milliequivalents per liter of the solution; and (b) bringing the crude aqueous hydrogen peroxide solution acidified in step (a) into contact with a strongly acidic cation-exchange resin in the hydrogen-form or a mixture of a strongly acidic cation-exchange resin in the hydrogen-form and a strongly basic anion-exchange resin in the hydroxy-form, carbonate-form or hydrogencarbonate-form, of which the volume fraction of the cation-exchange resin is at least 10% based on the total volume of the resin mixture.

In particular, the efficiency of the above defined method is further enhanced when the crude aqueous hydrogen peroxide solution as the starting material acidified in step (a) is kept standing for at least 6 hours at room temperature before step (b).

DETAILED DESCRIPTION OF THE PREFERRED EMBODIMENTS

The starting material used in the inventive method is a conventional aqueous hydrogen peroxide solution, referred to as the crude hydrogen peroxide solution hereinafter, containing metallic impurities in amounts not permissible when the hydrogen peroxide solution is to be used in the semiconductor process. The method for the preparation of the crude hydrogen peroxide solution is not particularly limitative to the so-called autoxidation method. The concentration of hydrogen peroxide in the crude hydrogen peroxide solution is also not particularly limitative but the inventive method is most efficiently applicable when the crude hydrogen peroxide solution contains from 5 to 60% by weight of hydrogen peroxide.

In step (a) of the inventive method, selection of the acid for the acidification of the crude hydrogen peroxide solution is important and, besides the requirement that the acid does not react with hydrogen peroxide, the acid must have an acid dissociation index pKa in pure water not exceeding 5. Examples of the acid which satisfies these requirements include inorganic acids such as sulfuric acid, nitric acid, hydrochloric acid, chlorous acid, hydrofluoric acid, phosphinic acid, phosphonic acid, phosphoric acid, diphosphoric acid and tripolyphosphoric acid and organic acids such as carboxylic acids, e.g., formic, acetic, chloroacetic, fluoroacetic, tartaric and benzoic acids, organophosphonic acids and organosulfonic acids, of which sulfuric acid, nitric acid, hydrochloric acid and phosphoric acid are preferable and sulfuric acid and nitric acid having a pKa of 2.0 and 1.4, respectively, at 25° C. in pure water are more preferable.

The amount of the acid is usually in the range from 0.005 to 5 milliequivalents or, preferably, from 0.005 to 1 milliequivalent or, more preferably, from 0.01 to 0.5 milliequivalent per liter of the crude hydrogen peroxide solution. The equivalent amount of an acid here implied is the molar amount of the acid multiplied by the ionic valency of the counteranion forming the acid.

In step (b) of the inventive method, the crude hydrogen peroxide solution acidified in step (a) is brought into contact with a bed of a strongly acidic cation-exchange resin or a mixture of a strongly acidic cation-exchange resin and a strongly basic anion-exchange resin in the form of beads. Most conveniently, this contacting treatment of the acidified crude hydrogen peroxide solution with the resin beads is conducted by continuously passing the solution through a column filled with the resin beads at an appropriate space velocity relative to the volume of the resin bed, for example, in the range from 1 to 1000 hour$^{-1}$ or, preferably, from 10 to 600 hour$^{-1}$. It is of course that the acidification of the crude hydrogen peroxide solution in step (a) can be performed either by the addition of the acid to the solution in advance before introduction into the resin-filled column or by the continuous and concurrent introduction of the crude hydrogen peroxide solution and the acid into the resin-filled column so as to effect in situ acidification of the solution inside of the column. Though not particularly limitative, the temperature of the aqueous solution or the resin bed in this contacting treatment should be in the range from the freezing point of the solution to 50° C. or, preferably, should not exceed 30° C. in order to minimize decomposition of hydrogen peroxide.

It has been unexpectedly discovered that the effect the ion-exchange treatment in step (b) of the inventive method is more remarkable when the crude hydrogen peroxide solution acidified in step (a) by the addition of an acid is kept standing as such for a certain length of time of, for example, at least 6 hours or, preferably, at least 12 hours or, more preferably, at least 24 hours, so as to say, to effect aging although the mechanism therefor is not well understood. The temperature of the acidified crude hydrogen peroxide solution in this aging treatment is not particularly limitative but, preferably, in the range from −10° to 50° C. or, more preferably, in the range from 0° to 30° C.

Various types of strongly acidic cation-exchange resins can be used including those having a three-dimensionally crosslinked structure prepared by the copolymerization of, for example, styrene and divinyl benzene or (meth)acrylic acid or an ester thereof and divinyl benzene followed by sulfonation. When a crude hydrogen peroxide solution after acidification in step (a) is passed through a column filled with a cation-exchange resin in the hydrogen-form, the solution can thoroughly be purified by the removal of impurities such as, for example, aluminum, which can partly form weak cations and anions as well as metallic compounds not completely soluble in the non-acidified crude aqueous hydrogen peroxide solution. It is of course that the contacting treatment of the acidified crude hydrogen peroxide solution with the cation-exchange resin can be performed as a batchwise process.

The aqueous hydrogen peroxide solution as purified by the contacting treatment with the cation-exchange resin can optionally be further brought into contact with an anion-exchange resin so that removal of the anionic impurities can be more complete along with the neutralizing effect on the acid added to the crude hydrogen peroxide solution.

Although the above described method, in which a crude hydrogen peroxide solution is brought into contact with a cation-exchange resin in the hydrogen-form, is quite effective for the purification of the hydrogen peroxide solution, it has been unexpectedly discovered furthermore that the efficiency of purification can be still enhanced when the crude hydrogen peroxide solution as acidified is brought into contact with, in place of a cation-exchange resin alone, a mixture of a strongly acidic cation-exchange resin and a strongly basic anion-exchange resin in a specific mixing proportion. It is important that the volume fraction of the cation-exchange resin in the mixture is at least 10% or, preferably, at least 20% based on the total volume of the mixture. The volume fraction of the anion-exchange resin in the mixture should be at least 10% or, in particular, at least 20% if the synergistic effect is desired by the combined use of the cation-exchange resin and the anion-exchange resin.

The strongly basic anion-exchange resin is used in the hydroxy-form, carbonate-form or hydrogencarbonate-form. Otherwise, the conditions for the contacting treatment with the mixture of a cation-exchange and anion-exchange resins can be approximately identical with those for the contacting treatment with the cation-exchange resin alone.

In the following, the method of the present invention is described in more detail by way of examples and comparative examples, which, however, never limit the scope of the invention in any way. In the following examples, determination of the contents of the metallic impurities was conducted by the ICP-MS (inductive coupling-mass spectrometric) method and the ion chromatographic method was applied to the determination of the contents of the anionic impurities in the crude and purified hydrogen peroxide solutions.

EXAMPLE 1

A column of a fluorocarbon resin having an inner diameter of 2.6 cm was filled with 100 ml of a strongly acidic cation-exchange resin in the free sulfonic acid form (Amberlite 201B, a product by Organo Corp.) to prepare a resin column. Separately, a crude aqueous hydrogen peroxide solution containing 31% by weight of hydrogen peroxide was acidified by the addition of sulfuric acid in an amount of 0.4 milliequivalent per liter. The crude hydrogen peroxide solution contained 150 ppb of aluminum, 5 ppb of iron and 10 ppb of chromium.

After standing at 15° to 20° C. for 24 hours, the thus acidified crude hydrogen peroxide solution was passed through the resin column at a space velocity of 500 hour$^{-1}$ relative to the volume of the resin bed to give a purified aqueous hydrogen peroxide solution. The contents of the respective metallic impurities in this purified hydrogen peroxide solution are shown in Table 1 to follow.

EXAMPLE 2

The experimental procedure was substantially the same as in Example 1 excepting for the replacement of the sulfuric acid with the same equivalent amount of nitric acid and extension of the standing time of the acidified crude hydrogen peroxide solution to 30 hours. The contents of the respective metallic impurities in the purified hydrogen peroxide solution are shown in Table 1 to follow.

EXAMPLE 3

The experimental procedure was substantially the same as in Example 1 excepting for the replacement of the sulfuric acid with the same equivalent amount of nitric acid. The contents of the respective metallic impurities in the purified hydrogen peroxide solution are shown in Table 1 to follow.

EXAMPLE 4

The experimental procedure was substantially the same as in Example 1 excepting for the replacement of the sulfuric acid with the same equivalent amount of nitric acid, extension of the standing time of the acidified crude hydrogen peroxide solution to 36 hours and increase of the space velocity to 600 hour$^{-1}$. The contents of the respective metallic impurities in the purified hydrogen peroxide solution are shown in Table 1 to follow.

EXAMPLE 5

The experimental procedure was substantially the same as in Example 1 except that passing of the acidified crude hydrogen peroxide solution through the resin bed was started shortly after the addition of sulfuric acid and collection of the eluted fractions of the hydrogen peroxide solution coming out of the resin column was terminated within 1 hour from the addition of sulfuric acid to the crude solution. The contents of the respective metallic impurities in the purified hydrogen peroxide solution are shown in Table 1 to follow.

EXAMPLE 6

The experimental procedure was substantially the same as in Example 1 excepting for the replacement of the sulfuric acid with the same equivalent amount of nitric acid and decrease of the standing time of the acidified crude hydrogen peroxide solution to 6 hours. The contents of the respective metallic impurities in the purified hydrogen peroxide solution are shown in Table 1 to follow.

Comparative Example 1

The experimental procedure was substantially the same as in Example 1 excepting for the omission of acidification of the crude hydrogen peroxide solution by the addition of sulfuric acid. The contents of the respective metallic impurities in the purified hydrogen peroxide solution are shown in Table 1 to follow.

Comparative Example 2

The experimental procedure was substantially the same as in Example 4 excepting for the omission of acidification of the crude hydrogen peroxide solution by the addition of nitric acid. The contents of the respective metallic impurities in the purified hydrogen peroxide solution are shown in Table 1 to follow.

Comparative Example 3

The experimental procedure was substantially the same as in Example 1 excepting for the replacement of the strongly acidic cation-exchange resin (Amberlite 201B) with a weakly acidic cation-exchange resin (Amberlite IRC-50, a product by Organo Corp.) in the hydrogen-form. The contents of the respective metallic impurities in the purified hydrogen peroxide solution are shown in Table 1 to follow.

Comparative Example 4

The experimental procedure was substantially the same as in Example 1 excepting for the replacement of the strongly acidic cation-exchange resin (Amberlite 201B) with a strongly basic anion-exchange resin (Amberlite IRA-900, a product by Organo Corp.) in the hydroxy-form. The contents of the respective metallic impurities in the purified hydrogen peroxide solution are shown in Table 1 to follow.

TABLE 1

|  | Al, ppb | Fe, ppb | Cr, ppb |
| --- | --- | --- | --- |
| Example 1 | <1 | <0.5 | <0.5 |
| Example 2 | <1 | <0.5 | <0.5 |
| Example 3 | <1 | <0.5 | <0.5 |
| Example 4 | <1 | <0.5 | <0.5 |
| Example 5 | 1.4 | 0.7 | 0.7 |
| Example 6 | 1.0 | 0.5 | 0.5 |
| Comparative Example 1 | 7.8 | 3.1 | 4.2 |
| Comparative Example 2 | 8.0 | 3.2 | 4.3 |
| Comparative Example 3 | 150 | 5 | 10 |
| Comparative Example 4 | 150 | 5 | 10 |

EXAMPLE 7

The former half of the process for the cation-exchange resin treatment was performed in just the same manner as in Example 1 and the purified aqueous hydrogen peroxide solution obtained thereby was further subjected to a contacting treatment with an anion-exchange resin. Thus, the purified solution obtained from the cation-exchange resin column, which contained 20,000 ppb of sulfate ions $SO_4^{2-}$ and 200 ppb of phosphate ions $PO_4^{3-}$, was passed at a space velocity of 500 hour$^{-1}$ through a resin column of a fluorocarbon resin having an inner diameter of 2.6 cm filled with 100 ml of a strongly basic anion-exchange resin (Amberlite IRA-900, supra) in the hydrogencarbonate-form and connected to a gasometer for the measurement of the gas volume evolved in the resin column. Table 2 below shows the analytical results for the contents of the metallic impurities and the above mentioned anionic impurities in the thus purified solution as well as the volume of the evolved gas in Nml per ml volume of the anion-exchange resin per hour.

EXAMPLE 8

The experimental procedure for the anion-exchange resin treatment was substantially the same as in Example 7 except that the aqueous hydrogen peroxide solution subjected to the anion-exchange resin treatment was that obtained in Example 2, which contained 25,000 ppb of nitrate ions $NO_3^-$, 50 ppb of sulfate ions $SO_4^{2-}$ and 200 ppb of phosphate ions $PO_4^{3-}$. Table 2 below shows the analytical results for the contents of the metallic impurities and the above mentioned anionic impurities in the thus purified solution as well as the volume of the evolved gas in Nml per ml volume of the anion-exchange resin per hour.

EXAMPLE 9

The purified hydrogen peroxide solution obtained in Example 3 was subjected to a further purification treatment. Thus the solution, which contained 25,000 ppb of nitrate ions, 10 ppb of sulfate ions and 200 ppb of phosphate ions, was passed at a space velocity of 250 hour$^{-1}$ through a resin column of a fluorocarbon resin having an inner diameter of 2.6 cm and filled with 100 ml of a 1:1 by volume mixture of the same cation-exchange resin as used in Example 1 and the same anion-exchange resin as used in Example 7, otherwise the conditions being the same as in Example 7. Table 2 below shows the analytical results for the contents of the metallic impurities and the above mentioned anionic impurities in the thus purified solution as well as the volume of the evolved gas in Nml per ml volume of the anion-exchange resin per hour.

EXAMPLE 10

The experimental procedure for the anion-exchange resin treatment was substantially the same as in Example 7 except that the strongly basic anion-exchange resin was in the hydroxy-form instead of the hydrogencarbonate-form and the aqueous hydrogen peroxide solution subjected to the anion-exchange resin treatment was that obtained in Example 4 which contained 25,000 ppb of nitrate ions $NO_3^-$, 10 ppb of sulfate ions $SO_4^{2-}$ and 200 ppb of phosphate ions $PO_4^{3-}$. Table 2 below shows the analytical results for the contents of the metallic impurities and the above mentioned anionic impurities in the thus purified solution as well as the volume of the evolved gas in Nml per ml volume of the anion-exchange resin per hour.

EXAMPLE 11

The experimental procedure for the anion-exchange resin treatment was substantially the same as in Example 7 except that the aqueous hydrogen peroxide solution subjected to the anion-exchange resin treatment was that obtained in Example 5, which contained 20,000 ppb of sulfate ions $SO_4^{2-}$ and 200 ppb of phosphate ions $PO_4^{3-}$. Table 2 below shows the analytical results for the contents of the metallic impurities and the above mentioned anionic impurities in the thus purified solution as well as the volume of the evolved gas in Nml per ml volume of the anion-exchange resin per hour.

Comparative Example 5

The experimental procedure for the anion-exchange resin treatment was substantially the same as in Example 7 except that the hydrogen peroxide solution introduced into the column of the anion-exchange resin was that obtained in Comparative Example 1, which contained 10 ppb of sulfate ions and 200 ppb of phosphate ions. Table 2 below shows the analytical results for the contents of the metallic impurities and the above mentioned anionic impurities in the thus purified solution as well as the volume of the evolved gas in Nml per ml volume of the anion-exchange resin per hour.

Comparative Example 6

The experimental procedure for the treatment with a mixture of a cation-exchange resin and an anion-exchange resin was substantially the same as in Example 9 except that the hydrogen peroxide solution introduced into the column of the ion-exchange resin mixture was that obtained in Comparative Example 1, which contained 10 ppb of sulfate ions and 200 ppb of phosphate ions. Table 2 below shows the analytical results for the contents of the metallic impurities and the above mentioned anionic impurities in the thus purified solution as well as the volume of the evolved gas in Nml per ml volume of the anion-exchange resin per hour.

Comparative Example 7

The experimental procedure for the anion-exchange resin treatment was substantially the same as in Example 7 except that the aqueous hydrogen peroxide solution subjected to the anion-exchange resin treatment was that obtained in Comparative Example 1 after acidification by the addition of 0.4 milliequivalent of sulfuric acid per liter, which contained 20,000 ppb of sulfate ions $SO_4^{2-}$ and 200 ppb of phosphate ions $PO_4^{3-}$. Table 2 below shows the analytical results for the contents of the metallic impurities and the above mentioned anionic impurities in the thus purified solution as well as the volume of the evolved gas in Nml per ml volume of the anion-exchange resin per hour.

Comparative Example 8

The experimental procedure for the anion-exchange resin treatment was substantially the same as in Example 10 except that the aqueous hydrogen peroxide solution subjected to the anion-exchange resin treatment was that obtained in Comparative Example 2, which contained 10 ppb of sulfate ions $SO_4^{2-}$ and 200 ppb of phosphate ions $PO_4^{3-}$. Table 2 below shows the analytical results for the contents of the metallic impurities and the above mentioned anionic impurities in the thus purified solution as well as the volume of the evolved gas in Nml per ml volume of the anion-exchange resin per hour.

Comparative Example 9

The experimental procedure for the anion-exchange resin treatment was substantially the same as in Example 7 except that the aqueous hydrogen peroxide solution subjected to the anion-exchange resin treatment was that obtained in Comparative Example 3, which contained 20,000 ppb of sulfate ions $SO_4^{2-}$ and 200 ppb of phosphate ions $PO_4^{3-}$. Table 2 below shows the analytical results for the contents of the metallic impurities and the above mentioned anionic impurities in the thus purified solution as well as the volume of the evolved gas in Nml per ml volume of the anion-exchange resin per hour.

TABLE 2

| | Al, ppb | Fe, ppb | Cr, ppb | $NO_3^-$, ppb | $SO_4^{2-}$, ppb | $PO_4^{3-}$, ppb | Gas evolution, Nml/ml-resin/hr |
|---|---|---|---|---|---|---|---|
| Example 7 | <1 | <0.5 | <0.5 | — | 3 | 5 | 0.1 |
| Example 8 | <1 | <0.5 | <0.5 | 5 | 3 | 5 | 0.1 |
| Example 9 | <1 | <0.5 | <0.5 | 5 | 3 | 5 | 0.1 |
| Example 10 | <1 | <0.5 | <0.5 | 5 | 2 | 5 | 0.5 |
| Example 11 | 1.2 | 0.5 | 0.5 | — | 3 | 5 | 0.2 |
| Comparative Example 5 | 7.6 | 2.9 | 4.0 | — | 3 | 5 | 0.6 |
| Comparative Example 6 | 7.0 | 2.5 | 3.5 | — | 4 | 5 | 0.5 |
| Comparative Example 7 | 7.6 | 3.0 | 4.1 | — | 4 | 5 | 0.4 |
| Comparative Example 8 | 7.5 | 2.9 | 3.9 | — | 3 | 5 | 8.0 |
| Comparative Example 9 | 150 | 4.7 | 9.7 | — | 3 | 5 | 1.0 |

EXAMPLE 12

The experimental procedure was substantially the same as in Example 1 excepting for the replacement of the strongly acidic cation-exchange resin with the same volume of a 1:1 by volume mixture of the same cation-exchange resin and a strongly basic anion-exchange resin (Amberlite IRA-900, supra) in the hydrogencarbonate-form and the space velocity was decreased to 250 hour$^{-1}$. The crude hydrogen peroxide solution contained 150 ppb of aluminum, 5 ppb of iron, 10 ppb of chromium, 20,000 ppb of sulfate ions after acidification with sulfuric acid and 200 ppb of phosphate ions. Table 3 below shows the respective contents of these impurities in the purified hydrogen peroxide solution.

EXAMPLE 13

The experimental procedure was substantially the same as in Example 12 excepting for the replacement of the sulfuric acid with the same equivalent amount of nitric acid. The crude hydrogen peroxide solution after acidification with nitric acid contained 150 ppb of aluminum, 5 ppb of iron, 10 ppb of chromium, 25,000 ppb of nitrate ions and 200 ppb of phosphate ions. Table 3 below shows the respective contents of these impurities in the purified hydrogen peroxide solution.

Example 14

Two ion-exchange resin columns were prepared each by filling a fluorocarbon resin column of 2.6 cm inner diameter with 100 ml of the same mixture of the cation-exchange and anion-exchange resins as used in Example 12 for the first column and the same anion-exchange resin alone for the second column. The same crude hydrogen peroxide solution acidified with nitric acid as used in Example 13 was, after standing for 36 hours from the acidification, passed through the first column at a space velocity of 250 hour$^{-1}$ and then through the second column at a space velocity of 500 hour$^{-1}$ to obtain a purified hydrogen peroxide solution. Table 3 below shows the respective contents of the impurities in the purified hydrogen peroxide solution.

EXAMPLE 15

Two ion-exchange resin columns were prepared each by filling a fluorocarbon resin column of 2.6 cm inner diameter with 100 ml of the same mixture of the cation-exchange and anion-exchange resins as used in Example 12 for the first column and the same cation-exchange resin alone for the second column. The same crude hydrogen peroxide solution acidified with nitric acid as used in Example 13 was, after standing for 24 hours from the acidification, passed through the first column at a space velocity of 250 hour$^{-1}$ and then through the second column at a space velocity of 500 hour$^{-1}$ to obtain a purified hydrogen peroxide solution. Table 3 below shows the respective contents of the impurities in the purified hydrogen peroxide solution.

EXAMPLE 16

The experimental procedure was substantially the same as in Example 12 except that the strongly basic anion-exchange resin was in the hydroxy-form instead of the hydrogencarbonate-form and the sulfuric acid was replaced with the same equivalent amount of nitric acid. Table 3 below shows the respective contents of the impurities in the purified hydrogen peroxide solution.

EXAMPLE 17

The experimental procedure was substantially the same as in Example 13 excepting for the replacement of the 1:1 by volume mixture of the cation-exchange and anion-exchange resins with the same volume of a 1:9 by volume mixture of the same cation-exchange and anion-exchange resins and decrease of the space velocity to 50 hour$^{-1}$. Table 3 below shows the respective contents of the impurities in the purified hydrogen peroxide solution.

Comparative Example 10

The experimental procedure was substantially the same as in Example 12 except that the crude hydrogen peroxide solution, which contained 150 ppb of aluminum, 5 ppb of iron, 10 ppb of chromium and 200 ppb of phosphate ions, was passed through the ion-exchange resin column without acidification by the addition of an acid. Table 3 below shows the respective contents of the impurities in the purified hydrogen peroxide solution.

Comparative Example 11

The experimental procedure was substantially the same as in Example 14 except that the crude hydrogen peroxide solution was passed through the two ion-exchange resin columns successively without acidification by the addition of an acid. Table 3 below shows the respective contents of the impurities in the purified hydrogen peroxide solution.

Comparative Example 12

The experimental procedure was substantially the same as in Example 15 except that the crude hydrogen peroxide solution was passed through the two ion-exchange resin columns successively without acidification by the addition of an acid. Table 3 below shows the respective contents of the impurities in the purified hydrogen peroxide solution.

Comparative Example 13

The experimental procedure was substantially the same as in Example 12 except that the ion-exchange resin filling the resin column was the same anion-exchange resin in the hydrogencarbonate-form alone. Table 3 below shows the respective contents of the impurities in the purified hydrogen peroxide solution.

Comparative Example 14

The experimental procedure was substantially the same as in Example 13 excepting for the replacement of the 1:1 by volume mixture of the cation-exchange and anion-exchange resins with the same volume of a 1:19 by volume mixture of the same cation-exchange and anion-exchange resins and the space velocity was decreased to 25 hour$^{-1}$. Table 3 below shows the respective contents of the impurities in the purified hydrogen peroxide solution.

TABLE 3

|  | Al, ppb | Fe, ppb | Cr, ppb | $NO_3^-$, ppb | $SO_4^{2-}$, ppb | $PO_4^{3-}$, ppb |
|---|---|---|---|---|---|---|
| Example 12 | 1.1 | 0.6 | 0.6 | — | 5 | 5 |
| Example 13 | 1.1 | 0.6 | 0.6 | 7 | — | 5 |
| Example 14 | 1.0 | 0.5 | 0.5 | 3 | — | 5 |
| Example 15 | ≦1.0 | ≦0.5 | ≦0.5 | 7 | — | 5 |
| Example 16 | 1.0 | 0.5 | 0.5 | 7 | — | 5 |
| Example 17 | 1.8 | 0.8 | 0.8 | 5 | — | 5 |
| Comparative Example 10 | 8.0 | 3.5 | 4.5 | — | — | 5 |
| Comparative Example 11 | 7.7 | 3.0 | 4.0 | — | — | 5 |
| Comparative Example 12 | 7.0 | 2.5 | 3.5 | — | — | 5 |
| Comparative Example 13 | 150 | 5 | 10 | — | 5 | 5 |
| Comparative Example 14 | 10 | 4.8 | 9.5 | 5 | — | 5 |

What is claimed is:

1. A method for the preparation of a highly purified aqueous hydrogen peroxide solution from a crude aqueous hydrogen peroxide solution containing metallic and inorganic impurities as the starting material which comprises the steps of:

(a) acidifying the crude aqueous hydrogen peroxide solution as the starting material by the addition of an acid having an acid dissociation index pKa in pure water not higher than 5 at 25° C. in an amount of 0.005 to 5 milliequivalents per liter of the solution; and (b) bringing the crude aqueous hydrogen peroxide solution acidified in step (a) into contact with a strongly acidic cation-exchange resin in the hydrogen-form or a mixture of a strongly acidic cation-exchange resin in the hydrogen-form and a strongly basic anion-exchange resin in the hydroxy-form, carbonate-form or hydrogencarbonate-form, of which the volume fraction of the cation-exchange resin is at least 10% based on the total volume of the mixture.

2. The method for the preparation of a highly purified aqueous hydrogen peroxide solution from the crude aqueous hydrogen peroxide solution as the starting material as claimed in claim 1 wherein the crude aqueous hydrogen peroxide solution as the starting material acidified in step (a) is kept standing for at least 6 hours before step (b).

3. The method for the preparation of a highly purified aqueous hydrogen peroxide solution from the crude aqueous hydrogen peroxide solution as the starting material as claimed in claim 1 wherein the crude aqueous hydrogen peroxide solution as the starting material acidified in step (a) is brought into contact with the strongly acidic cation-exchange resin or a mixture of a strongly acidic cation-exchange resin and a strongly basic anion-exchange resin by passing the solution through a column filled with the ion-exchange resin or resin mixture.

4. The method for the preparation of a highly purified aqueous hydrogen peroxide solution from the crude aqueous hydrogen peroxide solution as the starting material as claimed in claim 3 wherein the crude aqueous hydrogen peroxide solution is passed through the column at a space velocity in the range from 1 to 1000 hour$^{-1}$ based on the volume of the ion-exchange resin or the mixture of the ion-exchange resins.

5. The method for the preparation of a highly purified aqueous hydrogen peroxide solution from the crude aqueous hydrogen peroxide solution as the starting material as claimed in claim 1 wherein the acid is sulfuric acid or nitric acid.

6. The method for the preparation of a highly purified aqueous hydrogen peroxide solution from the crude aqueous hydrogen peroxide solution as the starting material as claimed in claim 1 wherein the temperature in step (b) is in the range from the freezing point of the solution to 50° C.

* * * * *